United States Patent
Lehane et al.

(10) Patent No.: US 9,424,257 B1
(45) Date of Patent: Aug. 23, 2016

(54) COMPILER AND OPERATING SYSTEM ADAPTED FOR GENERATING PROGRAMS FOR DECODING COMMUNICATION PACKETS UTILIZING A PROTOCOL STACK

(75) Inventors: Andrew Robert Lehane, Milnathort (GB); Antony Kirkham, Edinburgh (GB)

(73) Assignee: Keysight Technologies, Inc., Santa Rose, CA (US)

( * ) Notice: Subject to any disclaimer, the term of this patent is extended or adjusted under 35 U.S.C. 154(b) by 81 days.

(21) Appl. No.: 13/601,705

(22) Filed: Aug. 31, 2012

(51) Int. Cl.
*G06F 7/00* (2006.01)
*G06F 17/30* (2006.01)

(52) U.S. Cl.
CPC ...... *G06F 17/3002* (2013.01); *G06F 17/30398* (2013.01); *G06F 17/30404* (2013.01)

(58) Field of Classification Search
CPC .......... G06F 17/3002; G06F 17/30943; G06F 17/30292; G06F 17/30563; G06F 17/27; G06F 17/28
See application file for complete search history.

(56) References Cited

U.S. PATENT DOCUMENTS

| | | | | |
|---|---|---|---|---|
| 5,101,494 A * | 3/1992 | Bilski | | G06F 8/71 711/1 |
| 5,446,900 A * | 8/1995 | Kimelman | | G06F 11/362 714/1 |
| 5,509,006 A * | 4/1996 | Wilford et al. | | 370/401 |
| 5,584,026 A * | 12/1996 | Knudsen | | G06F 8/31 |
| 5,778,169 A * | 7/1998 | Reinhardt | | G06F 11/3696 714/38.1 |
| 6,138,112 A * | 10/2000 | Slutz | | G06F 11/3672 707/748 |
| 6,157,955 A * | 12/2000 | Narad | | H04L 45/16 709/228 |
| 6,161,216 A * | 12/2000 | Shagam | | G06F 11/3636 714/E11.209 |
| 6,356,950 B1 * | 3/2002 | Tillmann et al. | | 709/246 |
| 6,598,038 B1 * | 7/2003 | Guay | | G06F 17/30336 |
| 7,062,494 B2 * | 6/2006 | Kulkarni | | G06F 17/30412 |
| 7,266,131 B2 * | 9/2007 | Mitchell | | 370/469 |
| 7,606,263 B1 * | 10/2009 | Parker | | 370/474 |
| 7,657,471 B1 * | 2/2010 | Sankaran et al. | | 705/35 |
| 7,752,196 B2 * | 7/2010 | Rogers | | G06F 17/2705 707/716 |
| 8,336,021 B2 * | 12/2012 | McMurtry et al. | | 717/101 |
| 8,386,405 B2 * | 2/2013 | Antebi | | G06N 5/022 704/9 |
| 8,548,915 B2 * | 10/2013 | Antebi et al. | | 705/45 |
| 8,738,558 B2 * | 5/2014 | Antebi | | G06N 5/022 706/45 |
| 8,924,330 B2 * | 12/2014 | Antebi et al. | | 706/45 |

(Continued)

OTHER PUBLICATIONS

Perl Switch Statement—http://www.tutorialspoint.com/perl/perl_switch_statement.htm Date Retrieved: May 28, 2014 pp. 1-3 Author: tutorialspoint.*

(Continued)

*Primary Examiner* — Daniel Kuddus

(57) ABSTRACT

A method for operating a data processing system to extract information from a record is disclosed. The method includes defining a plurality of ALTERNATIVE statements. Each ALTERNATIVE statement includes a label that identifies that ALTERNATIVE statement, a Signature that defines a test that is to be performed on a field in the data record defined by a first window, and a NEXT statement that defines a different ALTERNATIVE statement and a second window for testing by that different ALTERNATIVE statement. In one aspect of the invention, the test includes a regular expression that is to match the field. The method defines a SCHEMA statement that defines a plurality of fields within the record. One of the defined fields includes an offset defining a location in the record, a field name, and a field length. The offset and/or the field length are computed by the data processing system.

19 Claims, 2 Drawing Sheets

RECORD FORMAT

| BYTE/ | 0 | 1 | 2 | 3 |
|---|---|---|---|---|
| A | | | | |
| B | | | | |
| | | | total_length | |
| | | | C | |

(56) References Cited

U.S. PATENT DOCUMENTS

| | | | |
|---|---|---|---|
| 2002/0157041 A1* | 10/2002 | Bennett | H04L 69/329 714/43 |
| 2004/0015482 A1* | 1/2004 | Kulkarni | G06F 17/30412 |
| 2004/0034703 A1* | 2/2004 | Phadke | 709/224 |
| 2005/0086638 A1* | 4/2005 | Farn | G06F 17/248 717/113 |
| 2007/0219973 A1* | 9/2007 | Cui et al. | 707/4 |
| 2007/0294234 A1* | 12/2007 | Dettinger et al. | 707/3 |
| 2009/0077619 A1* | 3/2009 | Boyce | 726/1 |
| 2009/0248468 A1* | 10/2009 | Cronin | G06Q 50/184 705/310 |
| 2010/0153932 A1* | 6/2010 | McMurtry | G06F 17/30923 717/143 |
| 2012/0291014 A1* | 11/2012 | Shrinivasan | G06F 11/3664 717/124 |
| 2013/0136127 A1* | 5/2013 | Hill et al. | 370/392 |

OTHER PUBLICATIONS

Perl Next Statement—http://www.tutorialspoint.com/perl/perl_next.htm Date Retrieved: May 28, 2014 Pertinent pp. 1-5 Author: tutorialspoint.*

Schwartz, Alan: "Tutorial: Perl, a psychologically efficient reforming language"; University of Illinois, 1998.*

* cited by examiner

RECORD FORMAT

| BYTE/ | 0 | 1 | 2 | 3 |
|---|---|---|---|---|
| A | | | | |
| B | | | | |
| | | | total_length | |
| C | | | | |

FIG. 2

COMPILER AND OPERATING SYSTEM ADAPTED FOR GENERATING PROGRAMS FOR DECODING COMMUNICATION PACKETS UTILIZING A PROTOCOL STACK

BACKGROUND

When data is sent over most modern communication networks, the data is packaged in a layered structure referred to as a "protocol suite" or "protocol stack". The data sent by the sender can be viewed as being wrapped in a multi-layer package in which each layer facilitates the transmission of the data through various hardware and software stages that separate the sender of the data from the final recipient.

There are a number of applications in which a third party, i.e., someone other than the sender and receiver, needs to decode the packets en route to obtain information that identifies the sender, receiver, and/or data being sent. A program for providing this function must be able to decode the packets to the level at which the desired information can be extracted. In some cases, this information needs to be extracted in real time, which further complicates the decoding software.

At each layer in this multi-layer package, there is generally information that identifies the protocol that is used for that layer and the layout of that layer, although many protocols exist in which there is no information in the layer at all about the layout, length or location and type of the next layer. The protocol of the outer layer is usually set by the communication link in question. However, the inner layers can vary considerably. There is no "index" of the packet layers at a known location in the packet. Hence, to decode the packets, the decoding program must "peal back" each layer in turn. This process involves decoding the header record for a layer, extracting data that specifies how that layer is configured, and, based on the extracted data, either reading the data of interest and/or jumping to a new location at which the next layer of interest has a header.

The number of different packet formats on any given communication link can be quite large. Hence, custom programs are needed for each type of communication link and application. At present, the task of writing a program to decode traffic is further complicated by the need to write the code in terms of the absolute location of the fields of interest within the data packets. For the purposes of this discussion, the absolute location of a field in a data packet is the offset of that field from the beginning of the data packet. In navigating from layer to layer, the offsets of the desired fields must be calculated by the programmer based on the values found in the preceding fields.

Keeping track of the absolute location of fields in the packet is a tedious and error-prone process. At each stage of the decoding process, the program must look at the contents of a specified field, make a determination based on those contents, and then jump to another location based on that determination. The programmer must keep track of the current offset, write code to determine the next field to examine based on the current location and fields, and then move to that new absolute location. This is both tedious and error prone. What is needed is a system that automatically keeps track of the absolute locations and allows the computations to be carried out in a time consistent with decoding packets at the bandwidth of the communication link being monitored.

SUMMARY OF THE INVENTION

The present invention includes a method for operating a data processing system to extract information from a record. The method includes defining a plurality of ALTERNATIVE statements. Each ALTERNATIVE statement includes a label that identifies that ALTERNATIVE statement, a Signature that defines a test that is to be performed on a field in the data record defined by a first window, and a NEXT statement that defines a different ALTERNATIVE statement and a second window for testing by that different ALTERNATIVE statement. In one aspect of the invention, the test includes a regular expression that is to match the field.

In another aspect of the invention, the NEXT statement in one of the ALTERNATE statements specifies a plurality of windows for testing in a predetermined sequence. In a still further aspect of the invention, the method includes a START statement that defines a NEXT statement that defines a first window for testing by one of the ALTERNATIVE statements. In another aspect of the invention, the START statement includes a second window for testing by that one of the ALTERNATIVE statements. The second window is used if testing of the first window fails.

In a still further aspect of the invention, the method defines a SCHEMA statement that defines a plurality of fields within the record. One of the defined fields includes an offset defining a location in the record, a field name, and a field length. In another aspect of the invention, the offset and/or the field length is computed by the data processing system.

In another aspect of the invention, the window in the NEXT statement is specified in terms of one of the fields in the SCHEMA statement. In yet another aspect of the invention, the method includes instructions that cause the contents and location of a field specified in the SCHEMA to be extracted from the record.

BRIEF DESCRIPTION OF THE DRAWINGS

FIG. 2 illustrates the structure of a protocol.

DETAILED DESCRIPTION

Figure 1:
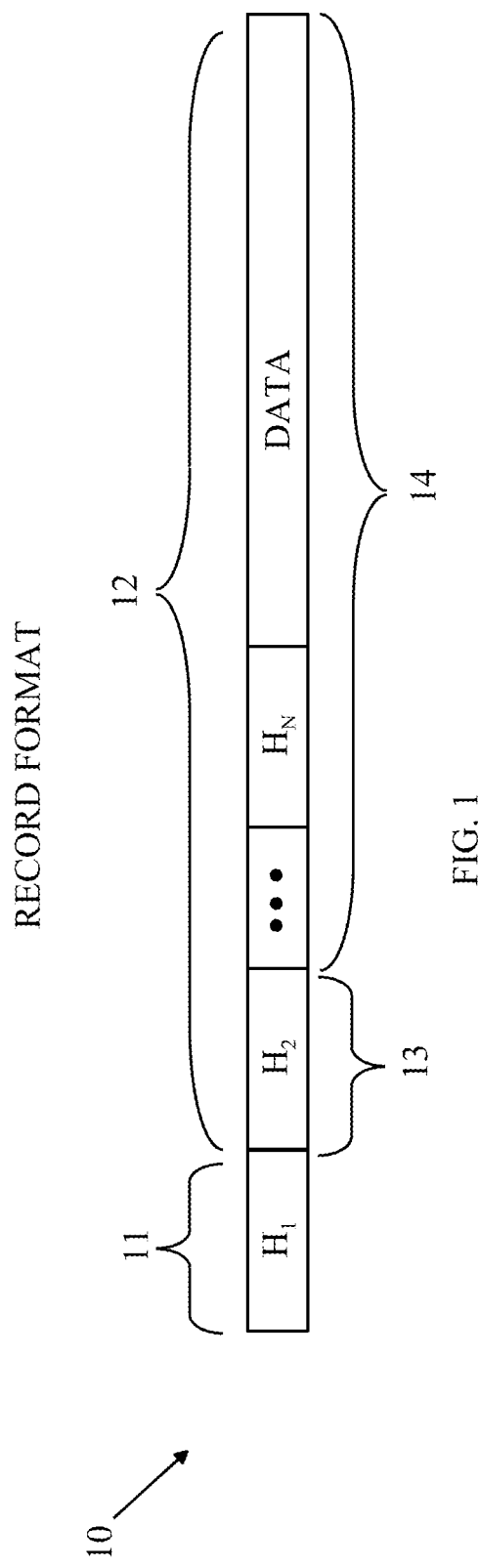
FIG. 1 illustrates a multi-layered data packet.

The manner in which the present invention provides its advantages can be more easily understood with reference to FIG. 1, which illustrates a multi-layered data packet. Data packet 10 can be viewed as having a header record 11 and a payload 12. The header record 11 contains information specifying where the payload is located and information used by the network in moving data packet 10 from one point to another on the network. Payload 12 is itself a layered data packet having a header 13 and a payload 14. Header 13 provides information about the type of data packet, information on how the data packet is laid out including the location of payload 14 with respect to header 13. This layering process continues until the final embedded data packet having header $H_N$ and DATA for its payload is reached. It should be noted that this is an ideal description: there are many protocols for which the header provides routing information only with no information about the contained payload. In addition, for simplicity, the examples shown below assume that information about the layout of the current layer is included in the header for that layer; however, the principles used by the method of the present invention apply even if such information is not present.

A third party is typically interested in a sub-set of the information contained in the various headers and/or the final data payload. To extract the data of interest, the third party must know the protocols that are used at each layer in the layered structure. In general, the third party knows the layout of the first layer of the protocol, since that layer is governed by the transmission link. However, the remaining layers each can have a number of different formats. In some cases, the number of possible combinations can be as high as 50. Absent some knowledge of the actual layering used in any given packet, the decoding program must try to decode the packet using various candidate protocols and testing fields to see if the candidate protocol was the correct one. Each test requires the programmer to specify a field to be tested in terms of a specific offset from the beginning of the packet and to examine that field to determine if its contents match a legal value for that field. Given a match, the program must then go on to test another field whose legal values may depend on the specific value found in the first field. A general programming language that allows this decoding process to proceed without requiring the programmer to keep track of the legal values, offsets, and alternative fields is required. The present invention provides such a programming language and compiler system.

The present invention is based on the observation that there are typically a plurality of fields in the packet whose contents can be tested to determine the packet structure. Furthermore, the sequence of tests needed to determine the packet structure can be organized as a decision tree in which the branching depends on which of a plurality of legal values are found in the test of one of the fields.

A decoding program according to the present invention, can utilize one or more "maps" that define the locations and lengths of the fields of interest within the packet. These maps will be referred to as SCHEMA in the following discussion. The manner in which these SCHEMA facilitate the process of building a decoding program will be discussed in more detail below.

A decoding program according to the present invention, uses a decision tree in which a field of interest is tested to determine if the contents of that field are "legal" and to define the next field to be tested depending on the results of the test. The next field to be tested may depend on which of the legal values were found for that field.

Figure 2:
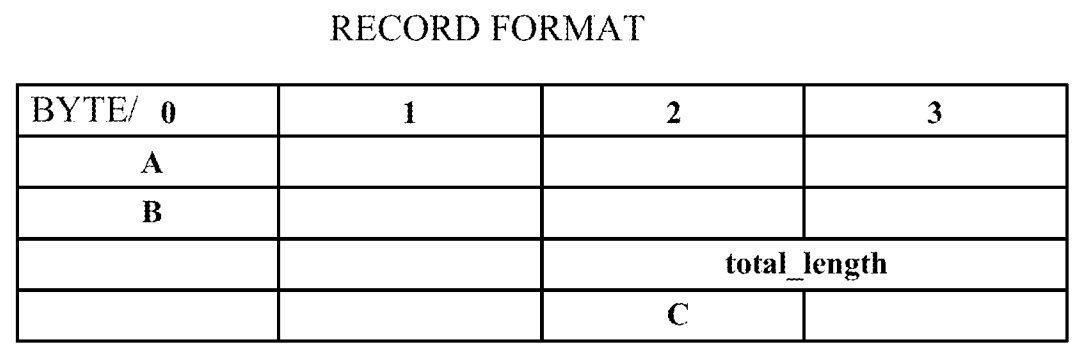

The manner in which a program to decode a packet is written can be more easily understood with reference to a simple example. Consider a protocol, P, that has the structure shown in FIG. 2. The description of the fields of interest is organized as a table having four bytes per row. The first field is field A which is located at the first byte of the section of the packet in question. This field will have one of a known list of predetermined values if the packet conforms to the structure shown in FIG. 2. Hence, the program must test the contents of A against this list of predetermined values. If a match is found, then the program goes on to match the contents of field B against a second list of predetermined values that are valid for that field. If a match is found, the program must read the contents of the total_length field which starts at a known offset from field B and compute the offset at which field C is located. If the value found in field C is found in a list of legal values for field C, the program knows that the packet conforms to this model and the values of the various fields can now be provided.

The code which expresses this can be written as follows:
```
t1 Signature_for_A {
   NEXT←t2[4,1];
}
t2 Signature_for_B{
   tot_len:[6,2];
   distance: tot_len-4;
   NEXT←t3[distance, 1]
}
t3 Signature_for_C { }
```

Here the labels t1, t2 and t3 specify the name of the ALTERNATIVES, Signature_for_A, Signature_for_B and Signature_for_C are the values that the fields A, B and C should have to be legal fields in this protocol. In this example, each field has only one possible Signature that it will match against. The manner in which the Signatures are defined will be discussed in more detail below.

In the simple example given above, there is only one ALTERNATIVE for each of the fields being tested. However, as noted above, there could be a number of ALTERNATIVES at each test. Consider the case in which a first set of legal values for field A leads to performing a test, t2, and a second set of legal values leads to a different test, t2a. The corresponding code would then be as follows:
```
t1 Signature_for_A_1 {
   NEXT←t2[4,1];
}
t1 Signature_for_A_2 {
   NEXT←t2a[6,1];
}
t2 Signature for tot_len {
   next←t2[4,1];
}
t2 Signature_for_B_2{
   tot_len:[6,2];
   distance: tot_len-4;
   NEXT←t3[distance, 1]
}
t3 Signature_for_C { }
```

In this example, the runtime selects the version of t1 that matches one of Signature_for_A_1 or Signature_for_A_2. In the event that Signature_for_A_1 matches then the next field is t2 at offset 4 with length 1. If Signature_for_A_2 matches then the next field is t2 at offset 6, length 1. A similar process is followed for t2. The runtime selects the ALTERNATIVE for t2 that matches the value in field A, which will be either Signature_for_A_1 or Signature_for_A_2. In both cases the next field is field t2, at different offsets, and the runtime will select the ALTERNATIVE for t2 that matches the field at the offset specified in the next statement in t1.

The above example decodes a "packet" based on the structure of the packet. The packet could be the entire intercepted packet on the transmission link or a sub-packet contained within that packet. In the latter case, the program could then go on to perform additional decoding of another sub-packet that is contained in this sub-packet based on known structure for that sub-packet.

While the above language constructs provide a useful structure for writing the decoding program, the programmer is still required to define the fields of interest in terms of their offsets and length from a known place in the packet, typically the beginning of the packet or sub-packet. As noted above, this process is both tedious and error-prone. The language of the present invention provides a construct for defining the map of the structure of the packet being processed in terms of the fields of interest and a mechanism that relieves the programmer of the chore of continually calculating offsets.

A key element in relieving the programmer of this tedious process is the use of a construct referred to as a "SCHEMA" to define the map that is used in the decoding of the packets. In addition to relieving the burden of calculating the offset at each test, the SCHEMAS of the present invention provide a mechanism for utilizing predefined structures that are relevant to known decoding programs. In this aspect of the invention, a library of SCHEMAS is provided to the programmer Hence, the programmer can be relieved of defining a SCHEMA for certain well known cases.

A SCHEMA is a list of fields of interest in the packet being decoded and information about those fields. In general, each entry specifies an optional explicit offset, a field name, and a field size. For example, the SCHEMA for a protocol P, having fields of interest a, b, c, and total_length discussed above with reference to FIG. 2 would be defined by

```
P={
                a:              1;
     [4]        b:              1;
     [10]       total_length:   2;
     [total_length-4]  c:       1;
}
```

This SCHEMA defines a first field A at offset 0 bytes with a length of 1 byte, a second field B offset by 4 bytes also having a length of 1 byte, a third field "total_length" offset by 10 bytes having a length of 2 bytes, and a fourth field C having a length of 1 byte offset by the value of the third field minus 4. The offsets are given relative to the beginning of the packet satisfying this structure. If an explicit offset is missing, it is assumed that the offset is zero in the case of the first field. If an explicit offset is missing in a subsequent field, the offset is computed to be the offset of the previous field plus the field length of the previous field.

It should be noted that not all possible fields are listed in this example. For example, the first location in P after A, would be a field at an offset of [2]. In principle, there could be some field at an offset of [2] with a length of 2 at that point in the packet. This SCHEMA is based on the fact that the programmer is not interested in the contents of that field if it exists. That is, a SCHEMA only needs to list the information that pertains to fields of interest that are likely to be used in testing the packet structure or in providing information that is to be output from a packet that satisfies the programmed structure.

Both the offset and length of a field in a SCHEMA may not be known until runtime. For example, the offset of field C in the above example is not known until runtime, since it depends on the contents of the "total_length" field, which can vary from packet to packet.

Similarly, the size of a particular field may not be known until runtime. For example a field specification of the form "[offset] f: c" specifies that the length of field F is the value in field C for the particular packet in question, which is not known until the particular packet to decode is provided to the program, as this value could change from packet to packet.

It should also be noted that the field length could be specified by a formula that depends on other fields whose values are known at runtime, e.g., (c+4−a). If the last field in a SCHEMA does not have a length specified, the field is defined to have a length that extends to the end of the packet.

Given a SCHEMA, the fields within the SCHEMA can be used to provide the field lengths and offsets in calculations and branch statements without requiring the programmer to calculate the corresponding offsets and field lengths. The compiler provides the code that allows the runtime program to insert the correct offsets and field lengths. The statement, "@P.a" refers to the location of field A in SCHEMA P relative to the current location in the packet. Hence, the programmer can indicate a location by a reference to the SCHEMA and the programmer can also indicate a field offset and length by referring to the SCHEMA. In terms of the SCHEMA notation, the branching code discussed above would be written as:

```
t1 Signature_for_A {
    @P.a;
    NEXT←t2@P.b;
}
t2 Signature_for_B{
    @P.b;
    NEXT←t3 @P.c;
}
t3 Signature_for_C { }
```

The runtime maintains the current location in the packet. The @P.a statement sets the current location to the beginning of field A in Schema P. The field to test in the Signature_for_A is assumed to have been sent prior to starting t1 by a NEXT statement in another branch statement. The inclusion of the @P.a, @P.b in the ALTERNATIVES could, in principle, be omitted. The compiler could deduce that if a NEXT statement contained a SCHEMA name e.g. t2@P.c then if @P.a is missing then @P.a could be assumed. To reduce the probability of coding errors, including the current location is preferred. For example, the developer meant to write @P.b and forgot. Hence, including the starting point explicitly reduces the probability of this type of error. To reduce the programming effort, if the ALTERNATIVE name has the same name as the SCHEMA the compiler will assume the first field in the SCHEMA to be the current location if the @P.a notation is missing. If the test is successful, test t2 is performed with field P.b as the field to be tested in the signature. In test, t2, the branch portion of the test sets the offset zero location to field B. The second statement defines field C as the next field to be tested. It should be noted that the runtime takes care of computing the offset for field C automatically, and hence the offset computation does not need to be provided by the programmer.

As noted above, the runtime operates on the contents of a field that is specified in terms of an offset and field size. This field can be defined in terms of a "window" that operates on the packet being decoded. For the purposes of this discussion, a window is defined to be a range of bytes in the packet characterized by an offset from the packet beginning and length. The origin of the window is provided by the "NEXT" statement in the branching statement. In the above examples, the window has a width equal to the field width for the field that is being matched; however, the window could have a larger width. In one aspect of the invention, the SCHEMAS also define a window for each field defined therein. The default window is the width of the field. An explicit window can be defined in a NEXT statement that does not use the SCHEMA representation of the field in question. for example, NEXT t2[0,2]

defines a window having offset 0 from the current location and a width of 2 bytes. The width is set independently of the field definitions, and could be larger than the field if a particular circumstance requires such a window. A smaller window can be used to match only part of a field with the test in a particular Signature. For example, if the field at offset 0 is actually a 4 byte long field, the 2 byte window defined above would match either the first or last two bytes depending on the location of offset 0 in that field.

In one aspect of the invention, the window can also specify an alignment statement of the form [8,4,2] or @P.b{2} in the case of a SCHEMA representation. This statement tells the runtime to move on by 2 bytes should the match fail. The runtime will match the signature against successive 2 byte groups until the end of the window is reached or a 2 byte group satisfying the signature is found. Other alignment values could be utilized. In one aspect of the invention, an alignment value of 0, the default if one is not specified, requires an exact match to the window size. An alignment value of 1 causes the signature to matched byte by byte until the end of the window or success. An alignment value of 2 causes pairs of bytes to be scanned. In principle, alignment values that are not powers of 2 can be utilized; however, such values are generally not preferred, since such values have a significant negative impact on the speed of execution of the runtime.

As noted above, a signature defines the values in the window that satisfy some condition. A signature generally has the form
Name=/Regular expression/

In one aspect of the present invention, a signature is analogous to a C language macro. A signature can be an IP address using the CIDR notation, i.e., 192.168.1.1/32, or a range of IP addresses. A signature can also be a bit field using 0, 1, or "x" for don't care. In one aspect of the invention, bit fields are limited to multiples of 8 bits and are delimited by the "%" character. For example a signature named Bit_f is defined by
Bit_f=% x0xxxxx1%

A special ALTERNATIVE branch referred to as "START" is defined to provide a way to specify which protocol the runtime should use as the start point for matching. For example,
START {
NEXT←ETHER[12,2];
}
causes the runtime to skip the first 12 bytes and then match against ALTERNATIVE named "ETHER".

The ALTERNATIVE has the format
Identifier {
  Body
}
where the body contains assignments, operators, and next ALTERNATIVES in that order. All of these elements are optional; that is, the body could be empty.

The Identifier has the form
NAME(S) Signature

The NAME is a sequence of letters and underscores. If more than one NAME is required, the NAMES are separated by commas. The Signature is the NAME of a predefined Signature as discussed above or a regular expression.

Assignments are of the form:
variable name: expression
where the expression is similar to a C expression and can use all the usual arithmetic operators except * and /. For example, an assignment that causes a read from the packet could have the form:
@P.a;
x: P.a>>4; or x: [0,2]>>4;
which would cause the system to read 16 bits from a location 0 bytes in from the start of the window, right shift it by 4 and assign it to x. In one aspect of the invention, all variables are immutable. Valid lengths are: 1, 2 and 4 when used in an assignment, but length is unconstrained if the operator is used in an operation.

The NEXT operator defines the ALTERNATIVE to use next in the matching and the window to use in the matching. A single ALTERNATIVE has the form:
NEXT←ALTERNATIVE_NAME@ SCHEMA_Name.field_name;
or
NEXT←ALTERNATIVE_NAME[Offset, length];

If there are several possible ALTERNATIVES that are to be searched in a specified order, these can be specified by writing:

NEXT←A@P.a,
  B@P.b, B[2,2],
  C@P.c; C[4,2];
or
NEXT←A[0,2],
  B[2,2],
  C[4,2];

Here, A, B, and C are names of ALTERNATIVES and P is the SCHEMA used in the examples discussed above. In this multiple searching mode, the offsets for the ALTERNATIVES must be different and increasing. The runtime will try to match against ALTERNATIVES A, B, and C in that order, and all ALTERNATIVES must be present.

As noted above, if a set of ALTERNATIVES fails, an error occurs. In this case, the program may anticipate this problem and provide a different set of ALTERNATIVES that identifies a different packet structure. In one aspect of the present invention, a backtrack operator "/" is defined that causes the runtime to repeat a search if the first ALTERNATIVES fail. For example,
START {
NEXT←ETHER[12,2]/PPP[0,6];
}
causes the runtime to try the ALTERNATIVE named ETHER first using the specified window. If the subsequent search fails to find a match, the runtime backtracks and tries the ALTERNATIVE named PPP in the corresponding window. In one aspect of the invention, the runtime will backtrack to this ALTERNATIVE if any subsequent match fails.

In one aspect of the present invention, the method of the present invention is practiced by providing a compiler that compiles the above-described language statements to a runtime program that receives packets from a packet stream or other source and processes those packets to provide the sought after information from the packets. In one aspect of the invention, the ALTERNATIVES are compiled to a finite state machine, which provides improvements in the execution time of the runtime program. This arrangement is particularly useful in situations in which the packets must be processed in real time.

While the present invention has been discussed in terms of a compiler for decoding communications packets, it should be noted that the structures provided in the present invention can also be used to facilitate the development of software to address other tree-structured decision processes. In such processes, each decision point in the tree has a number of ALTERNATIVES. The correct ALTERNATIVE is evaluated by comparing some data field(s) with a set of criteria provided by the application in question.

The present invention includes any computer readable storage medium that constitutes patentable subject matter under 35 U.S.C. 101 and that contains instructions that cause a computer or other data processing system to implement a compiler having one or more of the language features discussed above or to execute a runtime program generated from such language features. Such media include non-transitory storage media such as non-volatile computer memories including storage disks and the like.

In the above-described embodiments, a Signature utilizes a regular expression to define the pattern that must be matched in the window being tested. However, embodiments in which a more general function is provided in the form of a coded sub-routine could also be employed for the test of the pattern in the window.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims

What is claimed is:

1. A method for operating a data processing system to process a record, said method including defining a plurality of ALTERNATIVE statements, each ALTERNATIVE statement of said plurality of ALTERNATIVE statements comprising:
    a label that identifies said ALTERNATIVE statement;
    a signature that defines a test that is to be performed on a first field in said record; and
    a NEXT statement that identifies a different one of said ALTERNATIVE statements and that defines a second field in said data record to be said first field in said different one of said ALTERNATIVE statements if said test is satisfied, said data processing system generating an error if said test is not satisfied, wherein said first and second fields are different in at least one of said ALTERNATIVE statements and
    wherein said NEXT statement in one of said ALTERNATIVE statements specifies a plurality of fields for testing in a predetermined sequence by other ALTERNATIVE statements in a processing program, control being transferred to the first one of said other ALTERNATIVE statements in said predetermined sequence in which said test in that one of said other ALTERNATIVE statements is satisfied.

2. The method of claim 1 wherein one of said NEXT statements includes a first ALTERNATIVE statement, a backtrack operator, and a second ALTERNATIVE statement, control being transferred to said second ALTERNATIVE statement when a sequence of ALTERNATIVE statements beginning with said first ALTERNATIVE statement generates said error.

3. The method of claim 1 further comprising a START statement, said START statement comprising:
    a NEXT statement that defines a first window that defines said field for testing by one of said ALTERNATIVE statements, wherein said NEXT statement comprises a plurality of said ALTERNATIVE statements to be executed in sequence, control being transferred to said NEXT statement in said first ALTERNATIVE statement in said sequence for which said test in that ALTERNATIVE statement is satisfied.

4. The method of claim 3 wherein control is transferred to said next statement in said sequence of ALTERNATIVE statements when one of said tests in a subsequently executed ALTERNATIVE statement fails.

5. The method of claim 1 wherein said field in one of said NEXT statements is defined by a window length or a window offset that is specified by a computation that is defined in said ALTERNATIVE statement.

6. The method of claim 1 further comprising defining a SCHEMA statement that defines a plurality of fields within said record, one of said defined fields comprising an offset defining a location in said record, a field name, and a field length.

7. The method of claim 6 wherein said offset is computed by said data processing system.

8. The method of claim 6 wherein said field length is computed by said data processing system.

9. The method of claim 6 wherein said field in said one of said NEXT statements is specified in terms of one of said fields in said SCHEMA statement, said field being specified in terms of said field name.

10. The method of claim 6 further comprising instructions that cause a portion of one of said fields specified in said SCHEMA to be extracted from said record.

11. A non-transitory computer readable storage medium containing instructions that cause a data processing system to execute a method when read by said data processing system, said method comprising defining a plurality of ALTERNATIVE statements, each ALTERNATIVE statement of said plurality of ALTERNATIVE statements comprising:
    a label that identifies said ALTERNATIVE statement;
    a signature that defines a test that is to be performed on a first field in said record; and
    a NEXT statement that identifies a different one of said ALTERNATIVE statements and that defines a second field in said data record to be said first field in said different one of said ALTERNATIVE statements if said test is satisfied, said data processing system generating an error if said test is not satisfied, wherein said first and second fields are different in at least one of said ALTERNATIVE statements and
    wherein said NEXT statement in one of said ALTERNATIVE statements specifies a plurality of fields for testing in a predetermined sequence by other ALTERNATIVE statements in a processing program, control being transferred to the first one of said other ALTERNATIVE statements in said predetermined sequence in which said test in that one of said other ALTERNATIVE statements is satisfied.

12. The non-transitory computer readable storage medium of claim 11 wherein one of said NEXT statements includes a first ALTERNATIVE statement, a backtrack operator, and a second ALTERNATIVE statement, control being transferred to said second ALTERNATIVE statement when a sequence of ALTERNATIVE statements beginning with said first ALTERNATIVE statement generates said error.

13. The non-transitory computer readable storage medium of claim 11 further comprising a START statement, said START statement comprising:
    a NEXT statement that defines a first window that defines said field for testing by one of said ALTERNATIVE statements, wherein said NEXT statement comprises a plurality of said ALTERNATIVE statements to be executed in sequence, control being transferred to said NEXT statement in said first ALTERNATIVE statement in said sequence for which said test in that ALTERNATIVE statement is satisfied.

14. The non-transitory computer readable storage medium of claim 11 wherein said field defined in one of said NEXT statements is defined by a window length or a window offset that is specified by a computation that is defined in said ALTERNATIVE statement.

15. The non-transitory computer readable storage medium of claim 11 further comprising defining a SCHEMA statement that defines a plurality of fields within said record, one of said defined fields comprising an offset defining a location in said record, a field name, and a field length.

16. The non-transitory computer readable storage medium of claim 15 wherein said offset is computed by said data processing system.

17. The non-transitory computer readable storage medium of claim 15 wherein said field length is computed by said data processing system.

18. The non-transitory computer readable storage medium of claim 15 wherein said window in said NEXT statement is specified in terms of one of said fields in said SCHEMA statement, said field being specified in terms of said field name.

19. The non-transitory computer readable storage medium of claim 15 further comprising instructions that cause a portion of a field specified in said SCHEMA to be extracted from said record.

\* \* \* \* \*